(12) United States Patent
Liu

(10) Patent No.: US 6,523,707 B2
(45) Date of Patent: Feb. 25, 2003

(54) STRUCTURE OF A TUBE RACK WITH TELESCOPING FUNCTION

(76) Inventor: Lin-Ho Liu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/884,069

(22) Filed: Jun. 20, 2001

(65) Prior Publication Data

US 2002/0195411 A1 Dec. 26, 2002

(51) Int. Cl.[7] .................................................. A47F 5/00
(52) U.S. Cl. ........................ 211/206; 211/207; 248/161; 248/412
(58) Field of Search ................................ 211/207, 196, 211/206; 248/161, 411, 412

(56) References Cited

U.S. PATENT DOCUMENTS

| | | | | |
|---|---|---|---|---|
| 1,048,143 A | * | 12/1912 | Franke | |
| 2,658,777 A | * | 11/1953 | Rauglas | |
| 2,711,209 A | * | 6/1955 | Riabovol | |
| 2,961,260 A | * | 11/1960 | Newlin | |
| 3,144,946 A | * | 8/1964 | Ellis | |
| 3,560,033 A | * | 2/1971 | Barkus | |
| 3,807,574 A | * | 4/1974 | Lanza | |
| 4,113,222 A | * | 9/1978 | Frinzel | |
| 4,164,288 A | * | 8/1979 | Okazaki | 211/207 |
| 4,239,169 A | * | 12/1980 | DeSantis | 248/412 |
| 5,617,962 A | * | 4/1997 | Chen | 211/206 |
| 6,213,434 B1 | * | 4/2001 | Reichanadter | 211/207 X |

* cited by examiner

Primary Examiner—Robert W. Gibson, Jr.
(74) Attorney, Agent, or Firm—Troxell Law Office PLLC

(57) ABSTRACT

The present invention relates to an improved tube rack with telescoping function, more especially a structure that can be adjusted according to a desired length or height. The structure includes an outer sleeve, a threaded sleeve, an inner link, a telescopic shaft link with a fitting spring and a retaining seat. Through the motion of the retaining seat and the telescopic shaft link fitted with the spring, the present invention can be adjusted more efficiently to the user's satisfactory degree.

1 Claim, 6 Drawing Sheets

STRUCTURE OF A TUBE RACK WITH TELESCOPING FUNCTION

BACKGROUND OF THE INVENTION

1) Field of the Invention

The present invention relates to an improved structure of a tube rack with telescoping function, more especially such a tube rack usable with a garment rack, a computer desk, an umbrella, or any structure that can be adjusted to a desired length or height.

2) Description of the Prior Art

All the generally familiar adjustable type structures such as a garment rack, a computer desk and an umbrella have retaining holes with the same dimensions of the inner links and the outer sleeves. Retaining tenons are used to retain the retaining holes after being pressed to engage. However, the height adjusting method of this kind of structure still has shortcomings of being inconvenient for adjusting and unstable in use.

SUMMARY OF THE INVENTION

In view of this, the inventor of the present invention, following many tests and experiments, aimed to invent a structure which is capable of saving human movements and strengthening the micro-adjustmentfunction, and which not only will not cause operating inconvenience due to the augmented micro-adjustmentfunction, but will increase and enhance convenience and efficiency.

To enable a further understanding of the component, the method, the spirit and other objectives of the present invention, the brief description of the drawing below is followed by the detailed description of the preferred embodiments.

DETAILED DESCRIPTION OF THE PREFERRED EMBODIMENTS

Figure 1:
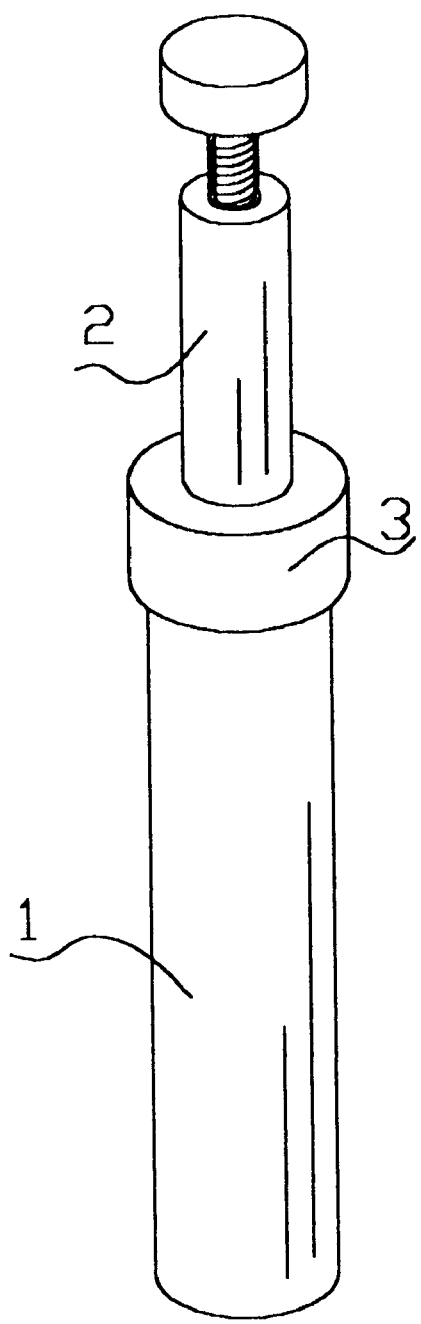
FIG. 1 is a pictorial and schematic drawing of the external view of the present invention.
Figure 2:
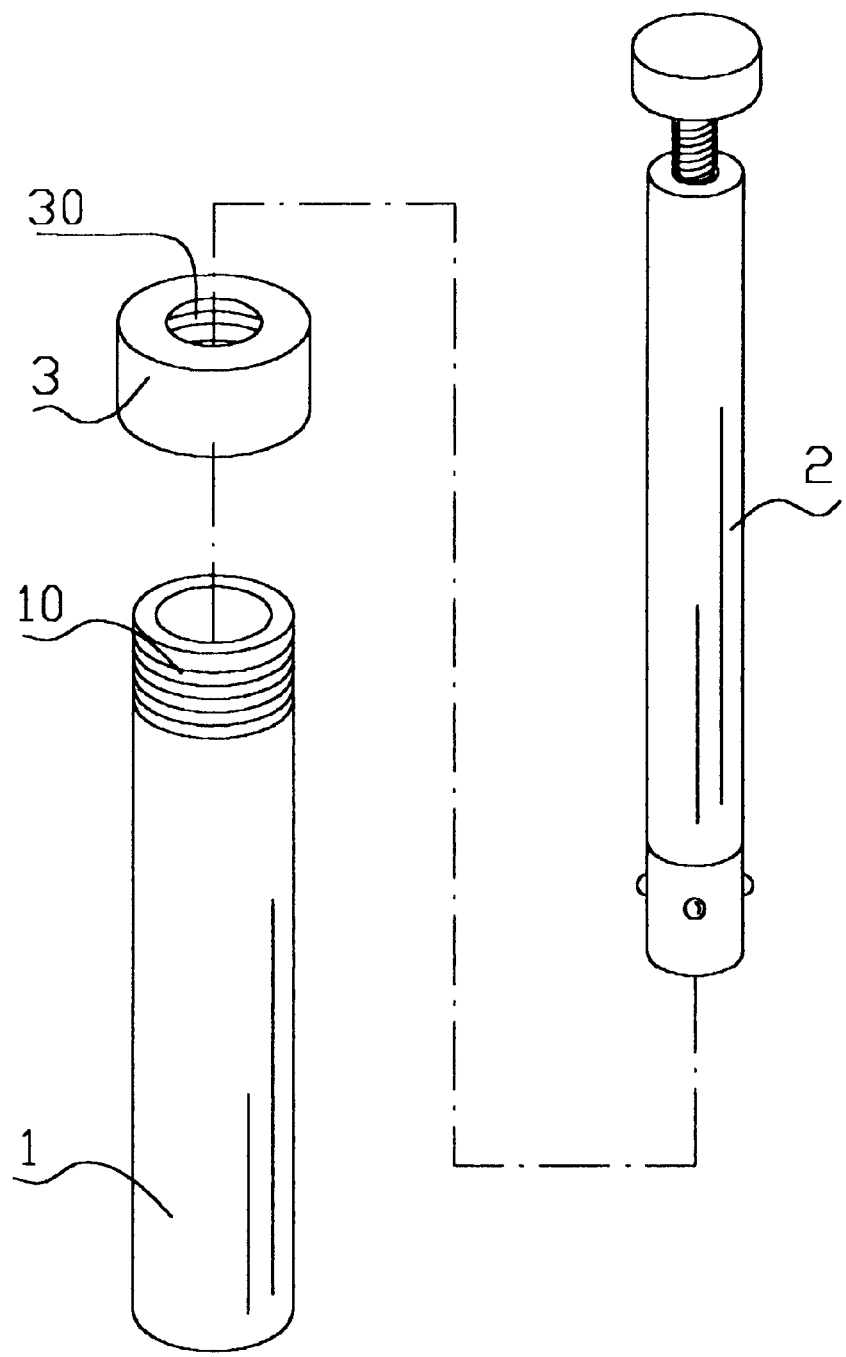
FIG. 2 is a pictorial, exploded and schematic drawing of the inner link and the outer sleeve of the present invention.
Figure 3:
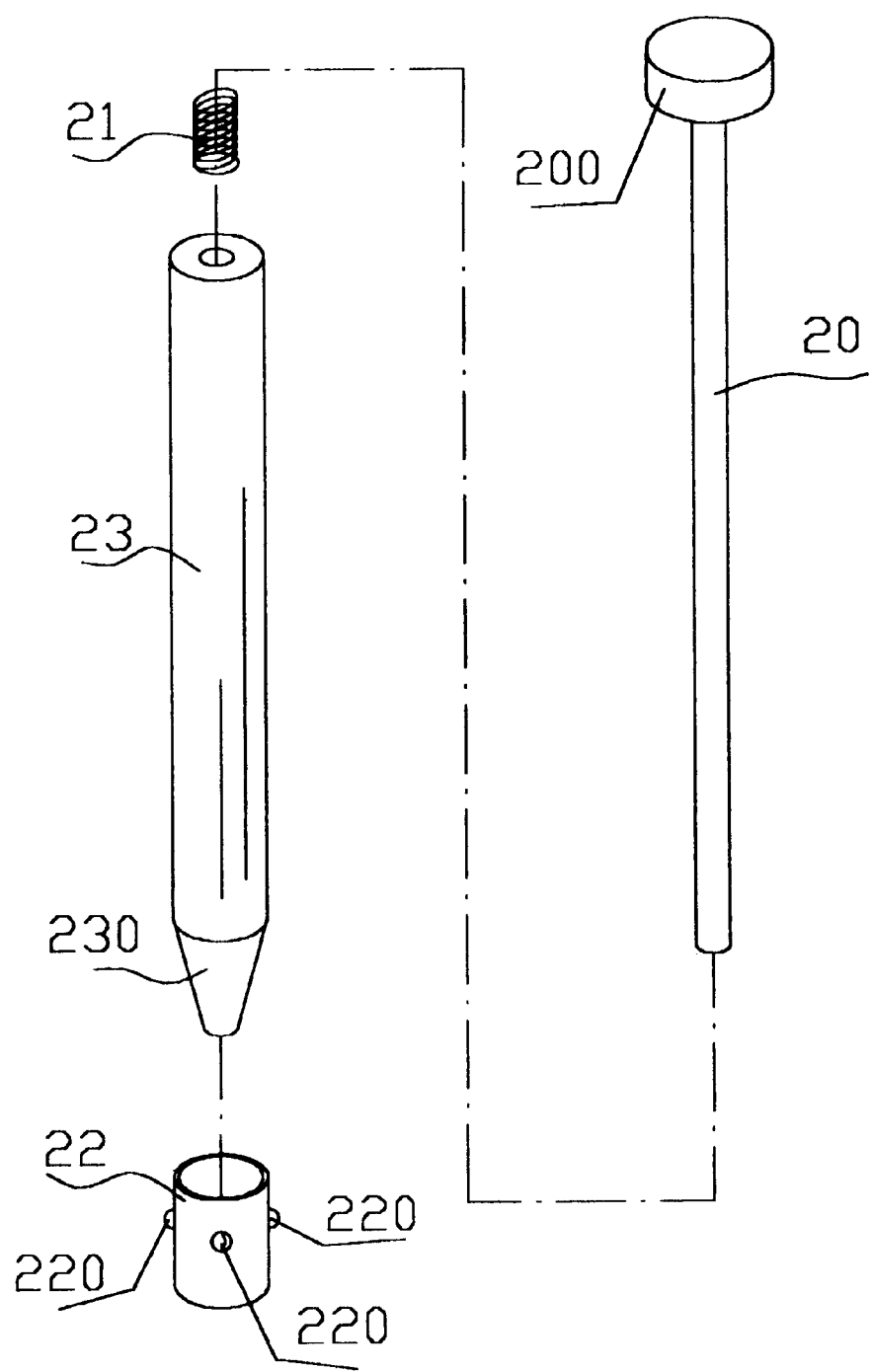
FIG. 3 is a pictorial, exploded and schematic drawing of the inner link of the present invention.

Referring to FIGS. 1, 2 and 3, the present invention of an improved structure of a tube rack with telescoping function mainly comprises an outer sleeve (1) having an inner link (2) therein, the inner link (2) extends from the external edge of the outer sleeve (1), into the internal space of the outer sleeve (1) and is secured and fixedly disposed by a threaded sleeve (3). The outer sleeve (1) is a hollow cylinder, one end plane of the outer sleeve (1) has the threads (10) for threading with the threaded sleeve (3). The main function of the outer sleeve (1) is to secure the inner link (2) therein, and through the function of a telescopic shaft link (20) with a fitting spring (21) and a retaining seat (22), to enable the inner link (2) to slide and telescope freely inside the outer sleeve (1) up to a certain fixed point on the outer sleeve (1) for securing.

The inner link (2) comprises a telescopic shaft link (20) with a press-button (200) thereon, fitted with a spring (21) and a retaining seat (22), the shaft link (20) passing through the internal space of the inner link sleeve (23). The spring (21) is disposed on the telescopic shaft link (20) between the press-button (200) and the inner link sleeve (23) so as to strengthen the recoiling ability of the telescopic shaft link (20) after sliding inside the inner link sleeve (23). The other end of the telescopic shaft link (20), relative to the end with the press-button (200), is connected with a retaining seat (22). The retaining seat (22) is a hollow sleeve, the lateral edge plane of the retaining seat (22) has several holes fitted with equivalent numbers of rolling beads (220). The rolling beads (220) are disposed in the holes and are capable of protruding outside or hiding in the lateral edge plane of the retaining seat (22). The diameter of the upper segment of the inner link sleeve (23) fits within the outer sleeve (1) to facilitate the protruding inner link (2) to telescope and slide freely and straightly relative to the outer sleeve (1). The external configuration of the lower segment (230) of the inner link sleeve (23) is conical.

The threaded sleeve (3) is hollow cylindrical structure with threads (30) therein which fit with the threads (10) of the outer sleeve (1) for threading to facilitate the final length fixing movement of the telescopic tube rack of the present invention and thereby increase the functional integrity of the present invention.

Figure 4:
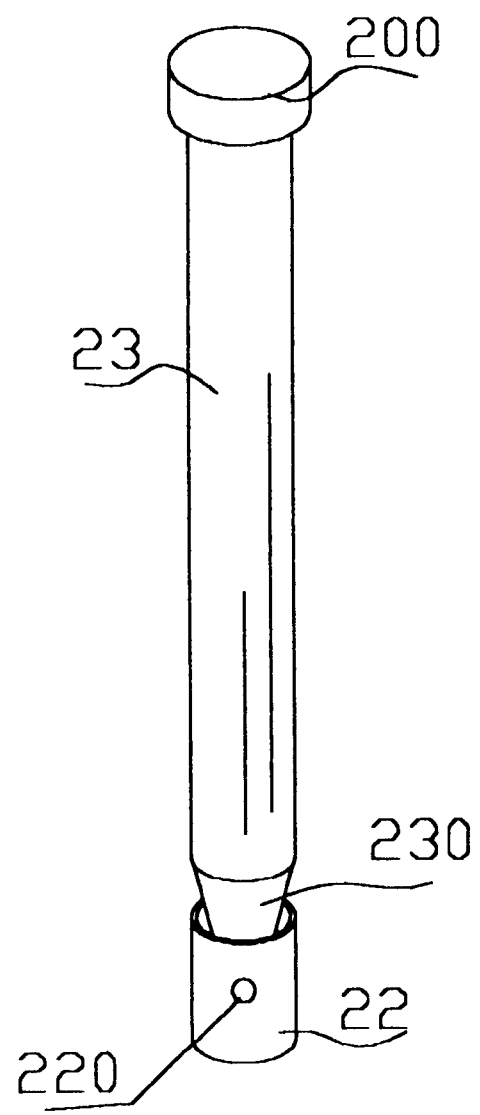
FIG. 4 is a schematic drawing of the external view of the protruding inner link of the present invention.

Referring to FIG. 4, the retaining seat (22) structure of the present invention is a hollow sleeve. The lateral edge plane of the retaining seat (22) has a plurality of holes fitted with equivalent numbers of rolling beads (220). The rolling beads (220) are disposed in the holes and are capable of freely protruding outside or hiding in the lateral edge plane of the retaining seat (22). The upper end of the retaining seat (22) links with telescopic shaft link (20). When making the inner link (2) of the present invention into a protruding state, it is only necessary to depress the press-button (200) downward. After being depressed downward, the press-button (200) moves the telescopic shaft link (20) as well as the retaining seat (22) downward. The retaining seat (22) separates downward from the conical segment (230), enabling the rolling beads (220) to roll into the lateral edge plane of the retaining seat (22) to hide naturally due to the separation from the forcing of the conical segment (230) edge plane.

Figures 5, 6:
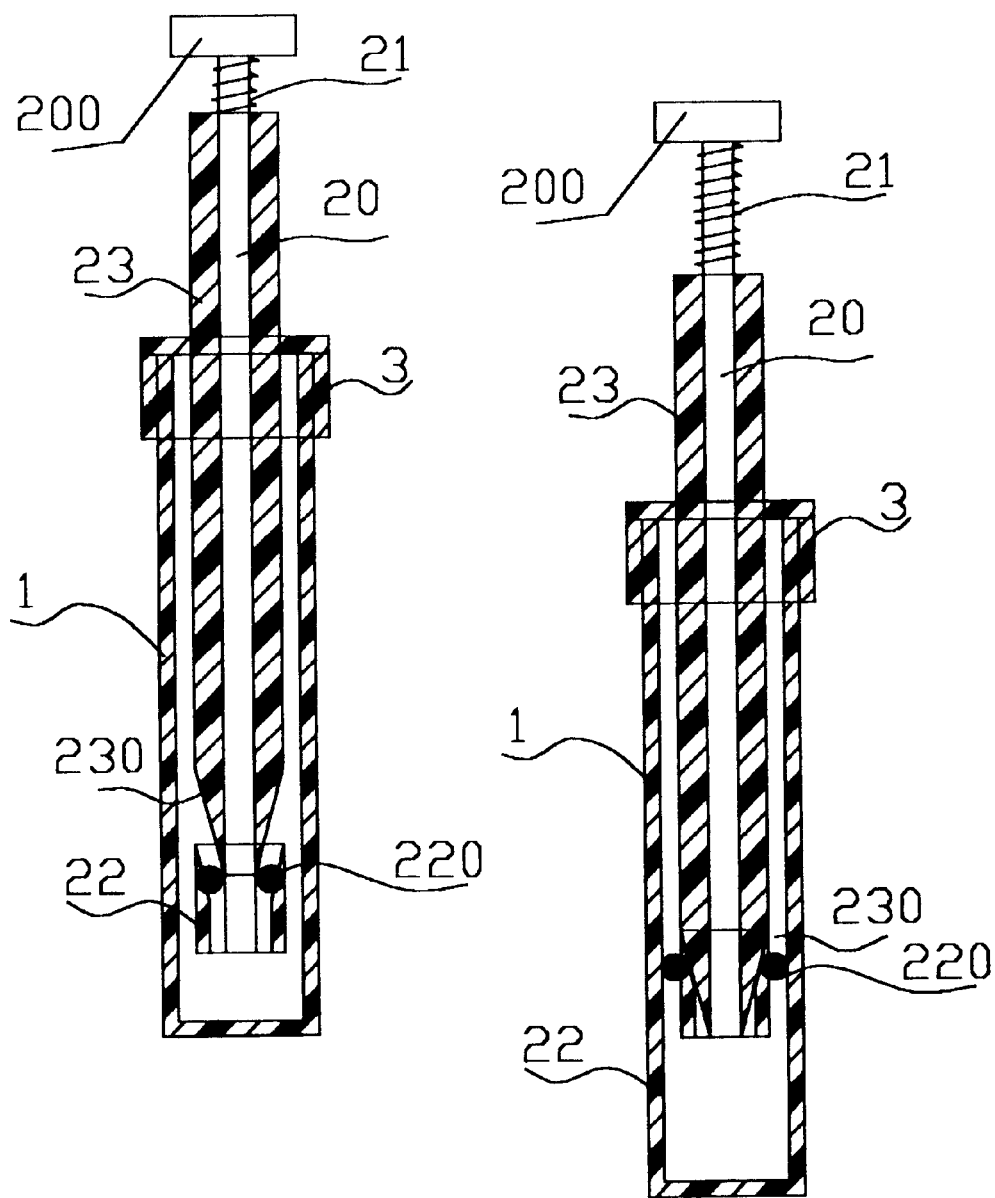
FIG. 5 is a laterally cross-sectional drawing of the present invention in a moving state.
FIG. 6 is a laterally cross-sectional drawing of the present invention in a stationary state.

Referring to FIGS. 5 and 6, when the user wants to adjust the length of the present invention of the tube rack with telescoping function, it is only necessary to depress the press-button (200) downward to enable the rolling beads (220) to naturally roll into the lateral edge plane of the retaining seat (22) and hide from the protruding state. After adjusting the inner link (2) straightly and freely to the proper length and height, release of the press-button (200). At this time, due to the recoiling force of the spring (21) the retaining seat (22) will telescope onto the conical segment driving (230) the rolling beads (220) to protrude outside the lateral edge plane of the retaining seat (22). The fixing will be done through the pressing engagement between the rolling beads (220) protruding outside the lateral edge plane of the retaining seat (22) and the outer sleeve (10).

Figure 7:
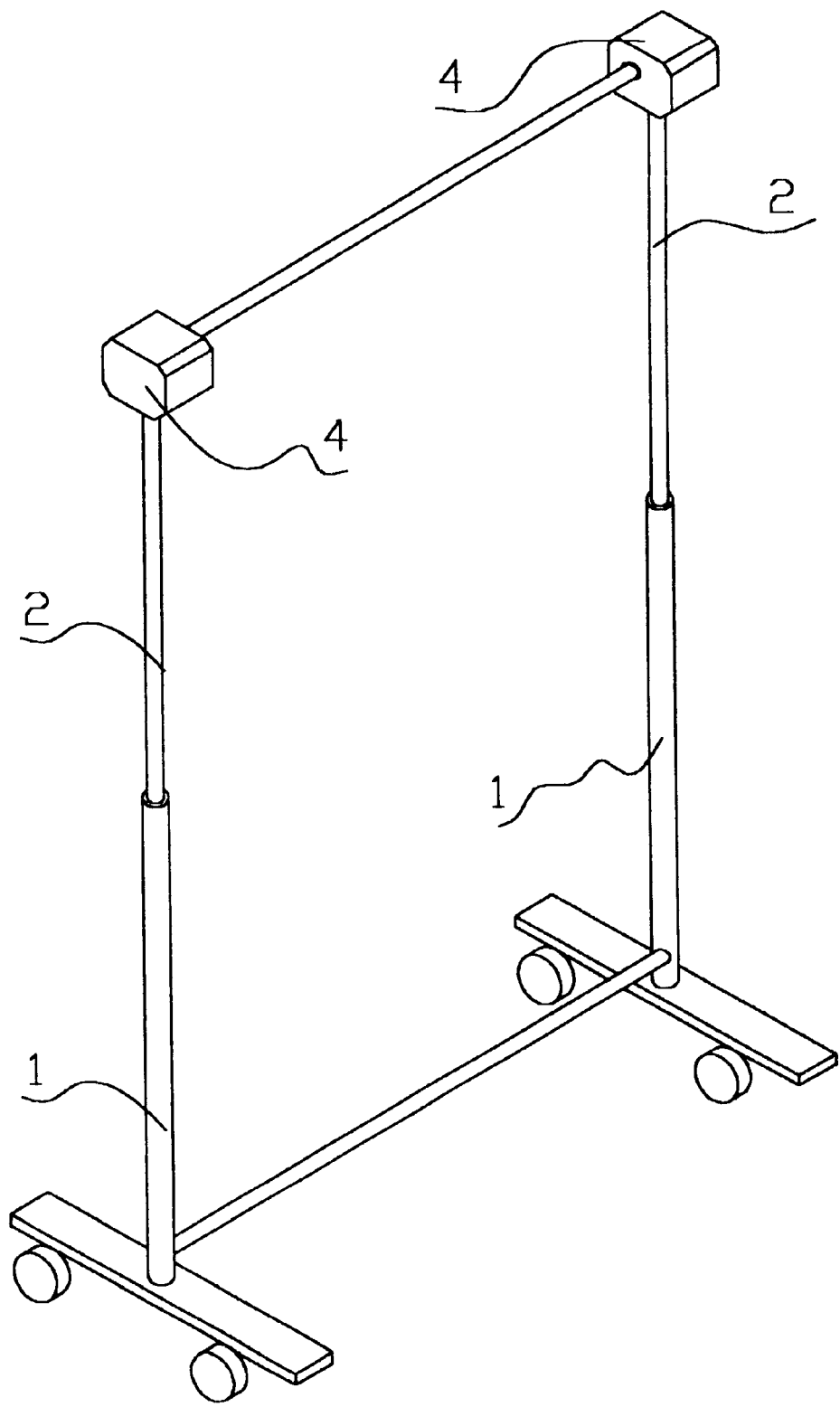
FIG. 7 is an exemplary embodiment drawing of the present invention.

Referring to FIG. 7, the present invention of an improved structure of a tube rack with telescoping function can be adapted to any structure to be adjusted to a desired length or height, such as adjustable structure bodies of a garment rack, a computer desk, an umbrella, a cane, a telescopic link, luggage, a mop, a lamp link, a chair, storage rack, etc., for having the function of increasing the supporting force and being easy to be raised or lowered. Hereby the inventor only uses the function of the adjusting structure of a garment rack as an exemplary embodiment of the present invention. In making the embodiment of the present invention, the objects such as an outer case and others for decorating can be added according to the need.

The structure of the present invention is simple and easy, capable of achieving the predicted efficiency, sufficient for eliminating the shortcomings of the conventional structure and is bestowed with extensive and practical functionality.

What is claimed is:

1. A tube rack with a telescoping function comprising:

a) a hollow elongated tubular sleeve having an open end, a closed end and an inner surface;

b) an inner link including an elongated, hollow inner link sleeve having a conical first end, and a second end, a shaft link passing through the inner link sleeve extending beyond the first and second ends thereof, a press button on a first end of the shaft link and a retaining seat on a second end of the shaft link, the retaining seat including a plurality of movable rolling beads movable between inward and outward positions relative to the retaining seat, the shaft link movable relative to the inner link sleeve between a first position in which the conical end of the inner link sleeve urges the rolling beads to the outward position and a second position in which the conical end of the inner link allows the rolling beads to move to the inward positions, the inner link being telescopically received in the tubular sleeve through the open end thereof, such that, when the shaft link is in the first position, the rolling beads contact the inner surface of the tubular sleeve to prevent relative movement between the inner link and the tubular sleeve;

c) a spring acting between the press button and the second end of the inner link sleeve urging the shaft link toward the first position; and d) a sleeve threadingly connected with the tubular sleeve at the open end, the inner link passing through the sleeve.

* * * * *